United States Patent [19]
Rueb et al.

[11] Patent Number: 6,066,845
[45] Date of Patent: *May 23, 2000

[54] LASER SCANNING METHOD AND SYSTEM

[75] Inventors: Kurt D. Rueb; Wayne R. Miller, both of Kitchener, Canada

[73] Assignee: Virtek Vision Corporation, Waterloo, Canada

[*] Notice: This patent is subject to a terminal disclaimer.

[21] Appl. No.: 08/970,478

[22] Filed: Nov. 14, 1997

[51] Int. Cl.⁷ .................................................. G01B 11/00
[52] U.S. Cl. ............... 250/234; 250/559.06; 250/559.19; 250/559.24; 356/372; 356/380; 356/387
[58] Field of Search .................................. 250/234, 235, 250/236, 559.06, 559.19, 559.22, 559.24, 559.26, 559.4, 559.42, 559.44; 356/372, 376, 377, 380, 386, 387

[56] References Cited

U.S. PATENT DOCUMENTS

| | | | |
|---|---|---|---|
| 4,061,914 | 12/1977 | Green | 250/234 |
| 4,635,289 | 1/1987 | Doyle et al. | 382/8 |
| 5,291,270 | 3/1994 | Koch et al. | 356/372 |
| 5,369,284 | 11/1994 | Bellio | 250/559.36 |
| 5,388,318 | 2/1995 | Petta | 250/235 |

Primary Examiner—John R. Lee
Attorney, Agent, or Firm—Howard & Howard

[57] ABSTRACT

A laser scanning method and system for determining an outline of an object. A laser beam is projected at the object and a surface underlying the object. The surface is configured to reflect the laser beam differently than the object. The laser beam is reflected off the object and the surface producing reflected beams. The reflected beams are received by a control which determines whether the beam was reflected from the object or the surface. By identifying this with the laser position the control can identify the part outline. As the laser beam is scanned over successive positions along the surface, the outline of the object is precisely determined.

3 Claims, 1 Drawing Sheet

LASER SCANNING METHOD AND SYSTEM

BACKGROUND OF THE INVENTION

This invention relates to a laser scanning method and system for determining an outline of an object.

Many industrial processes produce large parts, i.e., parts 2'×2' or greater, requiring a high degree of dimensional accuracy. For example, computer controlled laser cutting or stamping machines can produce large sheet metal parts with a dimensional tolerance of +/−0.004". Often, such large precise parts must be inspected to verify compliance with established dimensional tolerances.

To eliminate human error in the measurement of such large precise parts, the prior art has taught to establish an automated inspection system using solid state CCD camera technology. However, the use of solid state CCD camera technology to inspect the dimensional accuracy of a large precise part has several shortcomings. These prior art inspection systems are expensive and time consuming.

Lasers have been used to capture analog signals from an object and the surrounding area. These systems essentially operate like a CCD camera.

Lasers have also been used to project an outline or template for placement of a part. However, lasers have not been used to determine the dimensional outline of a part and thereby inspect the part for dimensional accuracy.

SUMMARY OF THE INVENTION

In a disclosed method and embodiment of this invention, a laser beam is projected at an object and a surface underlying the object. The surface is configured to reflect the laser beam differently than the object. The laser beam is reflected off the object and the surface and the reflected beams are captured. A control determines whether the beams were reflected from the object or the surface. As the laser beam is scanned over successive positions along the surface, the outline of the object is precisely determined.

In a preferred method, a coarse scan with the laser beam over the object and the surface is performed to establish a rough outline of the object and determine a starting position on the outline of the object. Thereafter, a fine scan, beginning at the starting position, is performed only over successive positions along the rough outline of the object.

In the above-described method and embodiment, it is required that the system be able to accurately identify the three-dimensional position and orientation of the laser projector with respect to the surface. Known methods of identifying the actual three-dimensional position and orientation may be utilized.

The laser scanning method and embodiment described above may be used to determine the precise outline of a part, such as sheet method stamping. In this manner, the part may be inspected to verify compliance with established dimensional tolerances.

These and other features of the present invention can be best understood from the following specification and drawings, of which the following is a brief description.

DETAILED DESCRIPTION OF A PREFERRED EMBODIMENT

Figure 1:
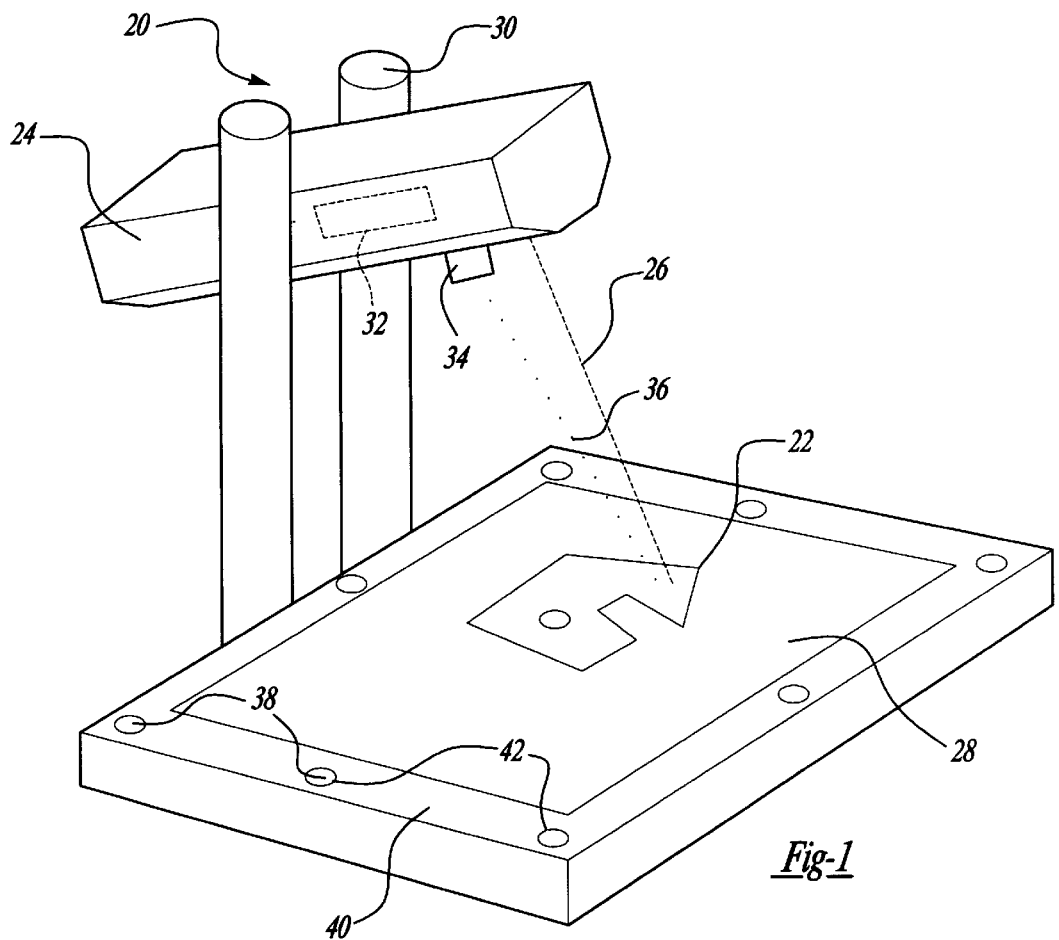
FIG. 1 is a perspective view of a laser scanning system according to the present invention.

FIG. 1 shows a laser scanning system 20 for determining an outline of a part or object 22. The laser scanning system 20 includes a laser projector 24 projecting a laser beam 26. The object 22 to be scanned is placed upon a surface 28. In a preferred embodiment, the surface 28 is covered with a retroreflective material, such as 3M Scotchlite "Engineering Grade" retroreflective sheeting 3290. However, as will become apparent to one skilled in the art, any surface configured to reflect the laser beam 26 differently than the object 22 may be used. The laser projector 24 must be mounted to a stable support structure 30. One skilled in the art will recognize that the laser projector 24 may be mounted by any means, including suspension from a ceiling, provided that the structure experiences only long term drift and not dynamic vibrations. A laser projector 24 having a sixty degree scan angle can produce a scan area of approximately 7'×7' when suspended from a height of 6' with a resolution of approximately 0.002" per scan step.

The laser scanning system 20 further includes a control 32 for scanning the laser beam 26 over the object 22 and the surface 28. The control 32 includes a reflection sensor 34 for receiving a reflected beam 36. These components are known in this art, and are illustrated schematically. Once a reflected beam 36 is received, the control 32 determines whether the beam 36 was reflected from the object 22 or the surface 28. As the laser beam 26 is scanned over successive positions along the surface 28, the outline of the object 22 is precisely determined. Essentially, the control 32 will always know "where" the laser beam is being directed. By associating this location with the type of reflected beam, the control will be able to identify whether a particular location is object or "surface". In this way, the control is able to identify an outline of the object.

In a preferred method, a course scan with the laser beam 26 over the object 22 and the surface 28 is initially performed to establish a rough outline of the object 22 and to determine a starting position on the outline of the object 22. Thereafter, a fine scan, beginning at the starting position, is performed only over successive positions along the rough outline of the object 22. As a result, the amount of scan time necessary to determine the precise outline of the object 22 is reduced. The preferred embodiment of this invention is capable of measuring hundreds of locations along the outline of the object 22 each second. For example, if measurements are taken every 0.010" along the outline of the object 22, approximately 5" of outline can be scanned each second.

The laser scanning system 20 must accurately calculate the three-dimensional position and orientation of the laser projector 24 with respect to the surface 28. Known methods of calculating the actual three-dimensional position and orientation may be utilized. Thus, the laser scanning system 20 includes at least four, but preferably eight, calibration targets 38; as known, calibration targets 38 are shown formed by positioning a frame 40 having a plurality of apertures 42 above and along the outer edges of the surface 28. However, other calibration techniques may be used. The plurality of apertures 42 expose the surface 28 lying underneath the frame 40 and, thereby, establish the calibration targets 38.

In the preferred embodiment a surface is placed adjacent the object. If a reflective surface is utilized, then the intensity of the reflected beam from the surface will be much greater than the intensity of the reflected beam from the object. In this way, the sensor can establish a minimum value for identifying a reflection. In such a system, the sensor could include an on/off switch, and the reflection from the object will be "off" while reflections from the surface will be "on". In other applications, the sensor can be more sophisticated and able to identify gradations in the value of the reflected beams. With such systems the surface need not be as starkly different in reflective capability. Thus, surfaces which are simply white paper may be utilized, and still will be capable of being sufficiently different in reflective qualities relative to the object to allow the invention to work.

Figure 2:
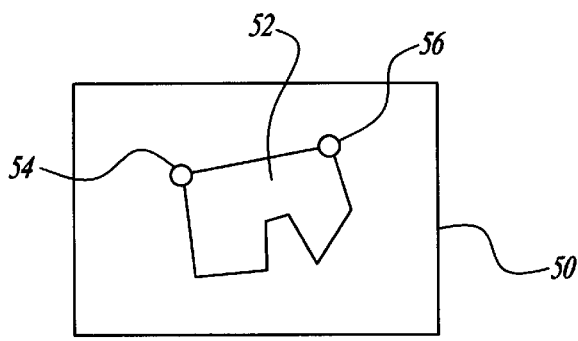
FIG. 2 shows one application of the present invention.

FIG. 2 shows a computer display 50 showing the determined outline 52 of the part. An operator may now use a computer mouse, or other movement or identification device to identify two points such as points 54 and 56 on the outline. Using known mathematical techniques, the system is then able to provide an indication of the dimensions between the identified point 54 and 56. Moreover, the entire dimensions of the part can also be determined utilizing known mathematical techniques.

Figure 3:
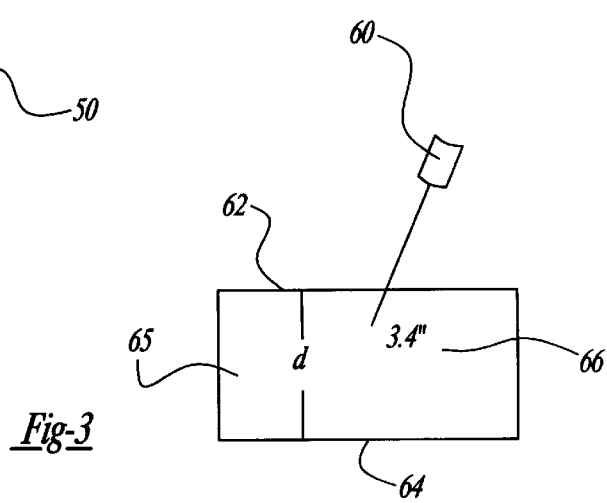
FIG. 3 shows another application of the present invention.

FIG. 3 shows another feature wherein a projector 60 identifies a long side 62 and 64 of the part 65. Those sides are spaced by a distance d. The system may be operable to then determine the distance d between sides 62 and 64 which may then be displayed such as at 66. This would assist an operator in checking the accurate dimensional characteristics at the work site, rather than having to travel to the computer. By serially moving amongst various locations on the part in performing a similar test, a worker will be able to easily perform quality control tests at the work location.

While there may be many applications of this invention, three primary ones are performing quality control tests on a part, and in particular a flat or two-dimensional part. Once the dimensions are entered in, they can be compared to stored CAD system data. In addition, the invention may be used for reverse engineering the shape and dimensions of a part. Also, the invention may be utilized to determine the dimensions of a part which has unknown dimensions.

The preferred embodiment of the invention is capable of determining the outline of a two-dimensional object at a resolution of 65536×65536 pixels. One skilled in the art will recognize that the laser projector 24 can further be used to display other useful information. For example, the laser beam 26 could be projected to highlight any burrs found on the object 22. That is, if the scan identifies a flaw in the part, the laser can highlight the flaw to assist in identification. Further, if a CAD file is available, the laser beam 26 could project the actual CAD data for comparison with the object 22 or highlight any portions of the object 22 out of tolerance. Finally, one skilled in the art will appreciate that sampling analog voltages would allow capture of grey scale images and would allow effective scanning of surfaces such as paper, blueprints, and photographic images.

A preferred embodiment of this invention has been disclosed, however, a worker of ordinary skill in the art would recognize that certain modifications come within the scope of this invention. For that reason, the following claims should be studied to determine the true scope and content of this invention.

What is claimed is:

1. A laser scanning system comprising:

a laser projector for projecting a laser beam;

a surface underlying an object for reflecting said laser beam, said surface configured to reflect said laser beam differently than said object; and a control means for scanning said laser beam over said object and said surface and determining an outline of said object based upon whether said laser beam was reflected from one of said object and said surface.

2. A laser scanning system as recited in claim 1, wherein said control means includes a reflection sensor to receive a reflected laser beam.

3. A laser scanning system as recited in claim 1, further including a plurality of calibration targets to calibrate said laser scanning system.

* * * * *